Patented June 15, 1937

2,083,719

UNITED STATES PATENT OFFICE 2,083,719

ABRASIVE PRODUCTS AND METHOD OF MAKING THE SAME

Joseph N. Kuzmick, Passaic, and Jerome Kuzmick, Clifton, N. J., assignors to Raybestos-Manhattan, Inc., Passaic, N. J., a corporation of New Jersey No Drawing. Application April 3, 1936, Serial No. 72,536

6 Claims. (Cl. 51—280)

This invention relates to the manufacture of various articles of bonded granular abrasive.

The principal object of the invention is directed to the production of articles such as grinding wheels, discs, segments, etc. wherein a synthetic resin is utilized as the bond and wherein the resin bond is combined with a modifying filler of such a nature as to produce abrasive articles of exceptional quality.

As a result of the practice of our present invention there are produced abrasive articles of superior cutting ability, greater durability, and improved resistance to heat generated during grinding. Another prime advantage resulting from the practice of our present invention is that the abrasive articles produced can be economically used at either low peripheral speeds of 5000 to 6000 surface feet per minute as are normally required for vitreous bonded abrasive articles, or at high peripheral speeds of 9000 to 15,000 surface feet per minute as are employed with rubber or synthetic resin bonded abrasive articles.

It is common practice to use fine filling materials in abrasive wheels bonded with synthetic resins. These filling materials exert a hardening effect on the binder; they distend the binder so as to produce more bulk for the same weight and they increase the resistance of the resin bond to distortion or softening under the elevated temperatures evolved during grinding. To accomplish these results, various fillers have been suggested and are being used in commercial practice, the most common ones being finely pulverized abrasives, such as alumina, pulverized flint, and silica, natural or synthetic cryolite, iron oxide, graphite, etc.

We have discovered that the incorporation of finely divided lead oxide and particularly lead monoxide or litharge, in a synthetic resin bonded abrasive article produces results surprisingly far superior to any fillers heretofore used. Whether the advantages derived from the use of lead oxide are due to mechanical or chemical action is at present not definitely known, but we believe the results are due to both.

Lead oxide reacts with phenolic bodies quite readily to form basic lead phenolates, Pb(OH)OC$_6$H$_5$, which in themselves are glass-like resinous bodies. There is a substantial amount of free phenol present in the synthetic resins commonly used as binders in abrasive bodies; free phenols in any quantity produce plasticity under elevated temperatures such as are encountered during grinding. Various materials have been suggested for tying up these free phenols, more specifically aldehydes, such as formaldehyde, furfural, or methylene producing bodies, such as trioxymethylene, hexamethylenetetramine, etc. An excess of formaldehyde or trioxymethylene tends to make the product bloat and split during the baking operation, while the use of furfural tends to produce products which in themselves are deleterious in a grinding wheel, such as hydrofuramide. An excess of hexamethylenetetramine tends to produce plasticity in the finished products at elevated temperatures, and is also open to the objection of added nitrogen being evolved during the baking operation. In the practice of the process of the present invention the lead oxide combines with the free phenol present, giving a more highly polymerized product. The basic lead phenolate produced may also act as a secondary catalyst in the final polymerization of the binder from the "A" to the "C" stage during the heating or baking cycle.

The lead oxide produces unforeseen results. When the lead oxide is intermingled with the resinous bond in discreet particles throughout the mass, it very materially hardens and toughens the layer of bond around the abrasive granules. This effect is peculiar in that while the cutting ability is not impaired, the wheel wear is greatly reduced, especially so in grinding operations where energetic use of the grinding wheel is necessary, such as snagging of heavy castings and high speed cutting off. Moreover, these advantages persist even when operating such wheels at greatly reduced peripheral speeds, such low speeds usually being impractical for the efficient operation of organic bonded wheels made outside the scope of our invention.

Extended investigation using other oxides, such as those of iron, zinc, chrome, etc., in the same volumetric proportion compared with lead oxide failed to show any improvement even over the ordinary fillers now in common use.

As an example showing the superiority obtained in a cut-off wheel by the use of lead oxide, two wheels identical in size, abrasive content, bond, and bond content were made up and tested. Wheel A contained lead oxide, and wheel B contained powdered alumina in the same volumetric proportions. These two wheels were run under identical conditions, cutting off the same type of material. Wheel A produced a total of 215 cuts, while wheel B produced a total of 125 cuts. The ratio of wheel wear to metal removed remained constant throughout the entire life of wheel A, whereas the wheel wear of wheel B increased 100% as the wheel wore down, due to reduced peripheral speed and its lower resistance to impact and heat.

While we prefer to use lead oxide in the form known as litharge (PbO), we do not wish to limit ourselves to this form only, as other oxides of lead may be used, but perhaps not so advantageously, for example lead suboxide ($Pb_2O$), red monoxide (PbO), lead sesquioxide ($Pb_2O_3$), lead oxide red ($Pb_3O_4$), and lead peroxide ($PbO_2$).

The inclusion of lead oxide is feasible in any of the methods now in use, that is, the liquid resin and dry pulverized resin method, such as is set forth in the application of Emil E. Novotny, Serial No. 382,584, filed July 31, 1929, the furfural and dry pulverized resin method and the furfuryl alcohol and dry pulverized resin method, such as are set forth, for example, in the patent to Emil E. Novotny and Joseph N. Kuzmick, No. 1,924,748, granted August 29, 1933, and also by the use of a straight liquid or semi-solid resin in a plastic mass.

The proportions of lead oxide may vary, but we have found that best results are obtained by using 25 to 150% on the bond content by weight, depending on the use the subsequent finished product will be put to.

In the liquid and dry resin method, or solvent and dry resin method, the lead oxide may be added directly to the abrasive granules before mixing, or as an alternative, the lead oxide may be thoroughly commingled with the dry pulverized resin before mixing. In the liquid resin method, the litharge may be added at any time during the mixing of the resin and abrasive granules.

As a specific example of an abrasive wheel made in accordance with our invention, we utilize the following proportions:—

| | Parts by weight |
|---|---|
| Abrasive granules, silicon carbide or crystalline alumina, any desired size | 700 |
| Lead oxide | 50 |
| Pulverized, potentially reactive phenolic synthetic resin | 100 |
| Furfuryl alcohol | 20 |

The abrasive granules are charged into a suitable device, such as a dough mixer, and the furfuryl alcohol added with stirring to thoroughly wet the granules. The pulverized synthetic resin and lead oxide are now added and quickly stirred in, the powdered resin and lead oxide previously being commingled together. The mix when ready to discharge will be loose and granular, each granule of abrasive being coated with a finely commingled mixture of resin and lead oxide. The mix is spread and leveled in an annular mold of desired dimensions, equipped with a follower plate for pressing. The mass in this form is pressed cold in a hydraulic ram press at a pressure of approximately 2000 lbs. per square inch. The article is discharged from the mold and placed in an oven and baked to convert the synthetic resin bond to the infusible stage.

We do not, however, preclude the use of hot pressing, or heat treating of the described granular mix after mixing, followed by hot or cold pressing, inasmuch as the same benefits are derived by the use of lead oxide regardless of whether the hot or cold methods are used.

We claim:

1. An abrasive article consisting of abrasive granules bonded together with a synthetic resin and lead oxide, the lead oxide being intimately intermingled and reacted with the synthetic resin bond and being so combined therewith as to form toughened and hardened coatings over the abrasive granules.

2. An abrasive article consisting of abrasive granules bonded together with a synthetic resin and lead oxide, the proportion by weight of the lead oxide being from 25% to 150% on the synthetic resin content, the lead oxide being intimately intermingled and reacted with the syntheic resin bond and being so combined therewith as to form toughened and hardened coatings over the abrasive granules.

3. An abrasive article consisting of abrasive granules coated with and bonded together by a cured synthetic resin combined with lead phenolate.

4. In the method of forming an abrasive article bonded with a potentially reactive heat hardening synthetic resin the steps which consist, in mixing abrasive granules with a potentially reactive phenolic synthetic resin having free phenol, and incorporating a finely divided lead oxide filler with the mix which is intermingled with the synthetic resin in discreet particles throughout the mass to produce a bond for the abrasive granules, the lead oxide combining with the free phenol in the synthetic resin to produce lead phenolate.

5. In the method of making an abrasive article bonded with a potentially reactive heat hardening synthetic resin the steps which consist, in intermingling finely divided lead oxide with the synthetic resin and abrasive granules, the lead oxide being intermingled with the resinuous bond in discreet particles throughout the mass, forming the article under pressure and heat hardening the same, the lead oxide being reacted and combined with the resin to form toughened and hardened coatings over the abrasive granules.

6. The method of claim 5 wherein the proportion by weight of the lead oxide is from 25% to 150% on the synthetic resin content.

JOSEPH N. KUZMICK.
JEROME KUZMICK.